United States Patent
Krill et al.

(10) Patent No.: US 7,379,088 B2
(45) Date of Patent: May 27, 2008

(54) SYSTEM AND METHOD FOR REAL-TIME IMAGE CONTROL AND PROCESSING FOR USE IN WIDE AREA SPACE BASED SURVEILLANCE

(75) Inventors: Jerry A. Krill, Ellicott City, MD (US);
Donald D. Duncan, Portland, OR (US);
Joe Frank, Potomac, MD (US)

(73) Assignee: The Johns Hopkins University, Baltimore, MD (US)

( * ) Notice: Subject to any disclaimer, the term of this patent is extended or adjusted under 35 U.S.C. 154(b) by 805 days.

(21) Appl. No.: 10/611,487

(22) Filed: Jul. 1, 2003

(65) Prior Publication Data

US 2004/0021770 A1   Feb. 5, 2004

Related U.S. Application Data

(60) Provisional application No. 60/392,849, filed on Jul. 1, 2002.

(51) Int. Cl.
H04N 7/18 (2006.01)
H04N 9/47 (2006.01)

(52) U.S. Cl. ............... 348/144; 398/125; 398/58; 398/91

(58) Field of Classification Search ............... None
See application file for complete search history.

(56) References Cited

U.S. PATENT DOCUMENTS

| | | | |
|---|---|---|---|
| 4,214,807 A | 7/1980 | Gfeller et al. | |
| 5,016,273 A | 5/1991 | Hoff | |
| 5,062,150 A | 10/1991 | Swanson et al. | |
| 5,218,467 A | 6/1993 | Ross et al. | |
| 5,282,073 A | 1/1994 | Defour et al. | |
| 5,416,623 A * | 5/1995 | Dawson et al. | 398/33 |
| 5,465,170 A | 11/1995 | Arimoto | |
| 5,552,920 A | 9/1996 | Glynn | |
| 5,592,320 A | 1/1997 | Wissinger | |
| 5,600,466 A * | 2/1997 | Tsushima et al. | 398/79 |
| 5,621,415 A | 4/1997 | Tuck | |
| 5,652,750 A | 7/1997 | Dent et al. | |
| 5,659,413 A | 8/1997 | Carlson | |
| 5,661,582 A | 8/1997 | Kintis et al. | |
| 5,689,354 A | 11/1997 | Orino | |
| 5,710,652 A | 1/1998 | Bloom et al. | |
| 5,722,042 A * | 2/1998 | Kimura et al. | 455/13.1 |
| 5,737,330 A | 4/1998 | Fulthorp et al. | |

(Continued)

OTHER PUBLICATIONS

U.S. Appl. No. 10/317,456, filed Dec. 2, 2002, Copending, co-owned.

(Continued)

*Primary Examiner*—Nhon Diep
(74) *Attorney, Agent, or Firm*—Albert J. Fasulo, II

(57) ABSTRACT

A system and method for providing real-time imaging for use in wide area space based surveillance utilizing an Optical Tera-bps Satellite (OPTSAT) network, including a plurality of OPTSATs, wherein an object is imaged with at least one surveillance aperture operatively linked to at least one of the plurality of OPTSATs is disclosed herein. The optical image data obtained the at least one surveillance aperture is processed in a one image processor, and displayed in a terminal capable of wirelessly transceiving information with the plurality of OPTSATs.

16 Claims, 11 Drawing Sheets

U.S. PATENT DOCUMENTS

| | | |
|---|---|---|
| 5,777,768 A | 7/1998 | Korevaar |
| 5,892,864 A | 4/1999 | Stoll et al. |
| 5,923,452 A | 7/1999 | Carlson |
| 5,979,830 A | 11/1999 | Kellermeier |
| 6,043,918 A | 3/2000 | Bozzay et al. |
| 6,097,522 A | 8/2000 | Maerki et al. |
| 6,181,450 B1 | 1/2001 | Dishman et al. |
| 6,222,658 B1 | 4/2001 | Dishman et al. |
| 6,246,498 B1 | 6/2001 | Dishman et al. |
| 6,246,501 B1 | 6/2001 | Dreischer et al. |
| 6,259,544 B1 | 7/2001 | Dishman et al. |
| 6,297,897 B1 | 10/2001 | Czichy et al. |
| 6,304,354 B2 | 10/2001 | Carlson |
| 6,323,980 B1 | 11/2001 | Bloom |
| 6,335,811 B1 | 1/2002 | Sakanaka |
| 6,347,001 B1 | 2/2002 | Arnold et al. |
| 6,731,415 B1 | 5/2004 | Plett |
| 6,944,403 B2 * | 9/2005 | Margalit et al. ............ 398/129 |
| 6,944,450 B2 | 9/2005 | Cox |
| 7,021,836 B2 * | 4/2006 | Anderson et al. ............. 385/89 |
| 2001/0012141 A1 | 8/2001 | Carlson |
| 2001/0039189 A1 | 11/2001 | Cox |
| 2003/0053770 A1 * | 3/2003 | Noddings et al. ............. 385/95 |
| 2003/0221118 A1 * | 11/2003 | Walker ....................... 713/193 |

OTHER PUBLICATIONS

Copending, Related, Co-Owned U.S. Appl. No. 10/317,456, filed Dec. 12, 2002, Krill et al.

Lasers in Space Technological Options for Enhancing US Military Capabilities by Mark E. Rogers, Nov. 1997, Center for Strategy and Technology.

Silex: The First European Optical Communication Terminal Orbit, by Tolker-Nielsen, Nov. 1998.

Optical Tracking Telemetry and Commanding (TT & c) for Small Satellites, Enoch, 13th AIAA/USU Conf. on small satellites.

NASA Earth Science Enterprise, Technology Planning Workshop, Fuk Li, Jan. 23-24, 2001.

\* cited by examiner

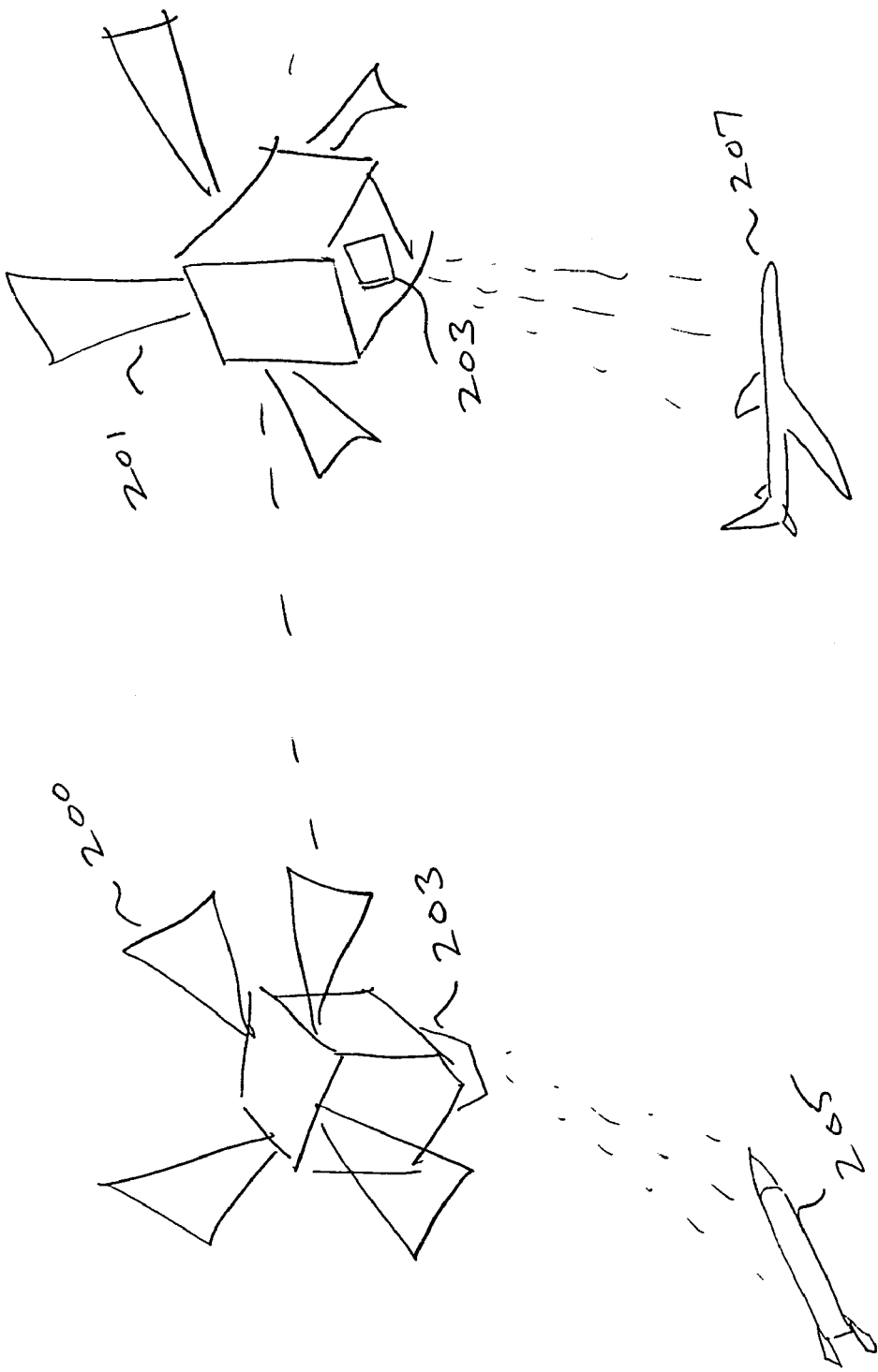

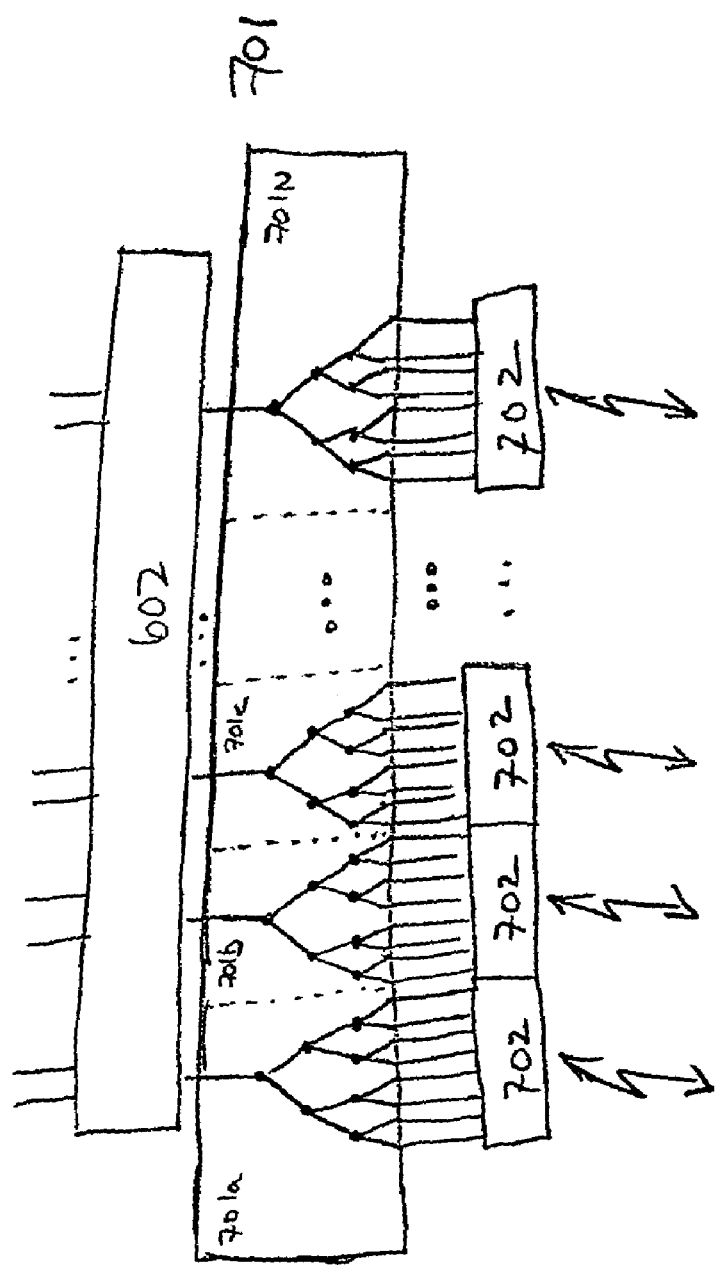

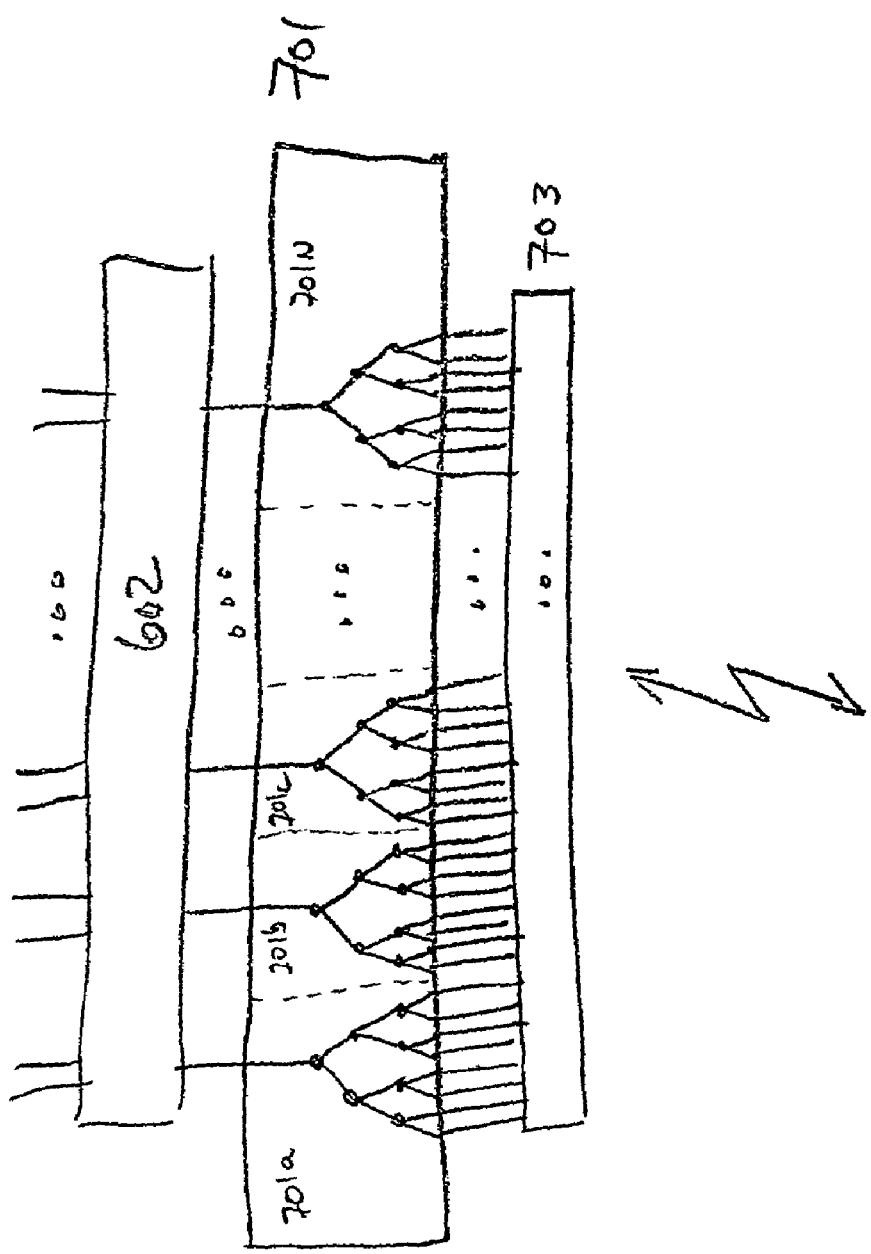

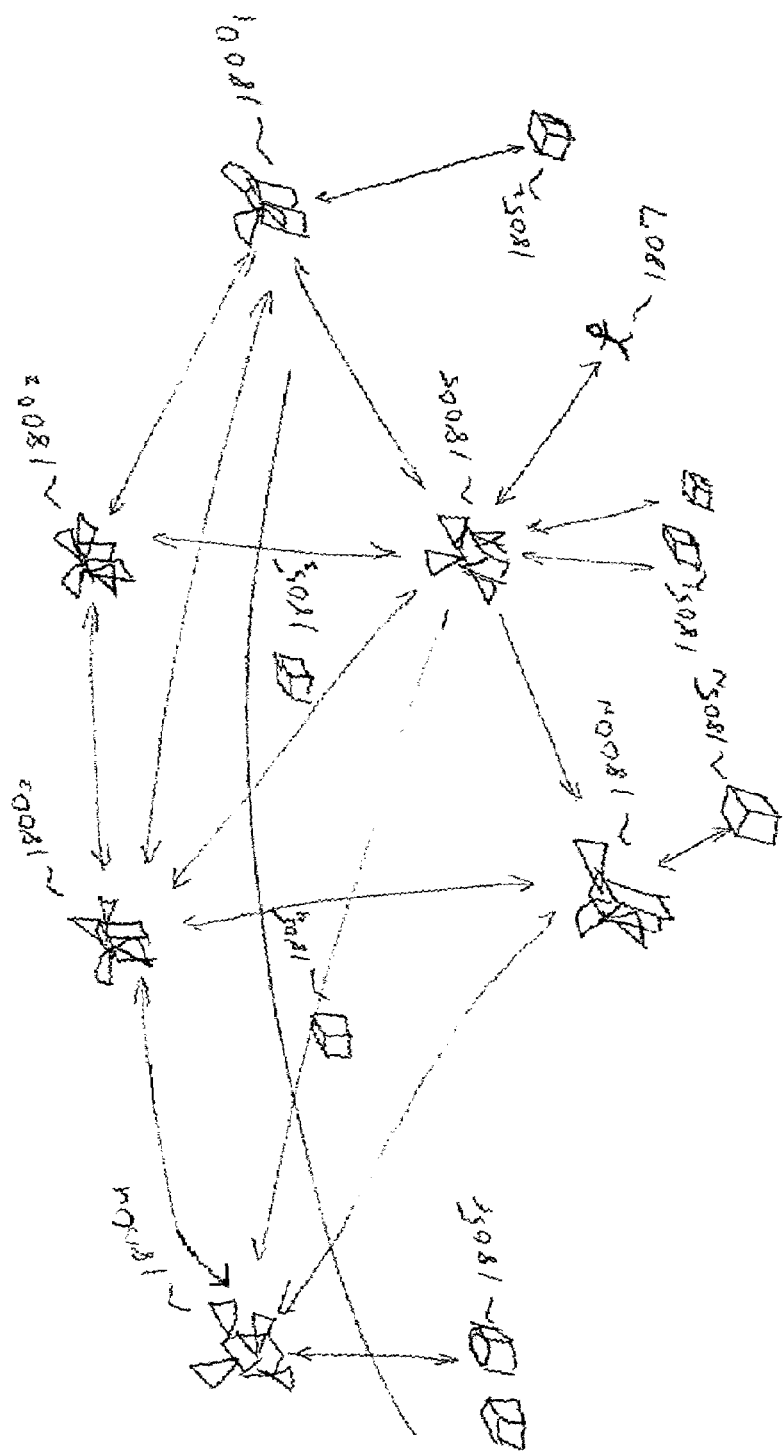

SYSTEM AND METHOD FOR REAL-TIME IMAGE CONTROL AND PROCESSING FOR USE IN WIDE AREA SPACE BASED SURVEILLANCE

CROSS-REFERENCE TO RELATED APPLICATIONS

The present application claims the benefit of a Provisional Application entitled "Multi-Warfare, Space-Based Surveillance and Control", filed in the United States Patent and Trademark Office on Jul. 1, 2002, and assigned application No. 60/392,849, the contents of which are hereby incorporated by reference.

BACKGROUND OF THE INVENTION

1. Field of the Invention

The present invention relates generally to a system and method for real-time imaging for use in wide area space based surveillance, and more particularly to a system and method for optically streaming satellite images utilizing an Optical Tera-bps Satellite (OPTSAT) Network.

2. Description of the Related Art

As remote sensing, more specifically, imaging observation satellites, increases in use and importance, a need to download large volumes of imagery data for processing by one or many users will also increase. For example, some applications for a representative imaging system featuring a multi-wavelength, satellite based, all-weather sensor constellation include: military applications, i.e., surveillance and defense systems; NASA applications for planetary exploration; Government applications for natural resource management, exploration, and conservation; disaster recovery surveillance; border surveillance for homeland defense; and commercial applications including food production status and news coverage from overhead.

Additionally, an imagery generation rate, especially for low-to-medium earth orbit satellite constellations, can be substantial. For example, an imaging satellite with a nominal 1 meter by 1 meter resolution, 16 bit digitalization, and coverage of a 2000 km wide swath with 4 wavelengths can generate about 0.6 Tera-bps (Tbps) of data ($0.6 \times 10^{12}$). With this data generation rate a constellation of, for example, 50 such satellites in a single orbiting plane generates 30 Tbps of image data. For 4 orbital planes, about 120 Tbps of data would be generated. If more wavelengths are used for each observation and with special extreme resolution modes, e.g., for identification of objects, the total generated data rate could approach 1 Peta-bps ($10^{15}$ bps). Such extreme data rates could essentially provide nearly continuous coverage to a nominal 1 m by 1 m resolution over the more populated regions of the world or a planet being explored. However, conventionally, the down-linking and processing of such extreme data rates would be a major challenge.

In a related application entitled "Satellite-Based Mobile Communication System", filed in the United States Patent and Trademark Office on Dec. 12, 2002, and assigned Ser. No. 10/317,456, the contents of which are hereby incorporated by reference, an OPTSAT Network is disclosed, which addresses these technical challenges. In the OPTSAT Network, a first terminal transmits a data and/or voice information signal to a multiple beam scanning array transceiver located in the at least one satellite. The multiple beam scanning array receives the signal at either a micro-mirror bank or an optical switch bank. The satellite routes the signal to a second terminal through the multiple beam scanning array, utilizing a micro-mirror bank or an optical switch bank. The multiple beam scanning array is capable of handling pluralities of transmit and receive signals at any point in time, and capable of capacities of up to at least tera bits per second transfer rates.

Therefore, with a rise in the need for national security as well as an overall increase in satellite imaging, a need exists for a system and method for optically streaming satellite image signal data utilizing Optical Tera-bps Satellite (OPTSAT) technology.

SUMMARY OF THE INVENTION

It is, therefore, an object of the present invention to provide a system and method for optically streaming satellite image data utilizing an Optical Tera-bps Satellite (OPTSAT) Network.

It is another object of the present invention to provide a system and method for optically streaming satellite image data utilizing an OPTSAT Network, wherein image data is directly translated into an OPTSAT downlink data stream.

It is yet another object of the present invention to provide a system and method for optically streaming satellite image data utilizing an OPTSAT Network, wherein each of the OPTSATs included in the OPTSAT Network include imagers capable of multi-tasking.

It is a further object of the present invention to provide a system and method for optically streaming satellite image data utilizing an OPTSAT Network, utilizing distributed, linked processing sites.

It is yet another object of the present invention to adapt some of the OPTSAT technology elements for use in imaging sensors to enable segmented data streaming (within the bandwidth capabilities of electronic signal processing) and parallel tasking of different sub-assemblies of the imager.

It is another object of the present invention to provide a system and method for optically streaming satellite images utilizing an OPTSAT Network, utilizing direct downlinking for processing by multiple sites on the ground.

To achieve the above and other objects, there is provided a system for providing real-time imaging for use in wide area space based surveillance utilizing an Optical Tera-bps Satellite (OPTSAT) network, including a plurality of OPTSATs, the system comprising: at least one surveillance aperture operatively linked to at least one of the plurality of OPTSATs for imaging an object; at least one image processor (generally in the network but not onboard the satellites) for processing optical image data obtained by the at least one surveillance aperture; and at least one terminal capable of wirelessly transceiving information between the at least one terminal and the at least one of the plurality of OPTSATs.

Additionally, there is provided a method for providing real-time imaging for use in wide area space based surveillance utilizing an Optical Tera-bps Satellite (OPTSAT) network, including a plurality of OPTSATs, the method comprising: imaging an object with at least one surveillance aperture operatively linked to at least one of the plurality of OPTSATs; processing optical image data obtained by the at least one surveillance aperture in at least one image processor (in the network but generally at an earth site); and displaying an image of the object in at least one terminal capable of wirelessly transceiving information between the at least one terminal and the at least one of the plurality of OPTSATs.

By using the system and method, a means and mode are provided for real time imaging and processing of high resolution imagery. In addition the resulting satellite imaging and down-linking concept known as the Optically Streamed Imaging Satellite (OSISAT) constellation is presented based on the capabilities of the OPTSAT. This is provided to integrate the novel features into a new conceptual capability and also to provide a context for the value of such features. OSISAT and OPSAT are referred to herein as separate functional entities for the purpose of articulating their respective features. The likely configuration preferably combines OPTSAT and OSISAT into a common satellite platform. This form of optical streaming may be of value in many applications such as distributed processing from hundreds or thousands of surveillance sensors around a city or along the national border as part of homeland defense.

BRIEF DESCRIPTION OF THE DRAWINGS

The above and other objects, features and advantages of the present invention will become more apparent from the following detailed description when taken in conjunction with the accompanying drawings in which:

FIG. 2 is a diagram illustrating integrated features of a surveillance system according to an embodiment of the present invention;

FIG. 4B is a detailed view of the optical switch bank unit depicted in FIG. 4A;

FIG. 4C is a detailed illustration of a second embodiment of optical apertures shown in FIG. 4A and FIG. 4B;

FIG. 8 illustrates distributed, multi-site image processing according to an embodiment of the present invention.

DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail. Also, throughout the application no distinction will be made between voice and data communications, and the terms "data communication" and "data" will be used herein without intending to exclude other types of communications. Also, although not strictly equivalent, GHz and Gbps, etc. will be used interchangeably.

Figure 1:
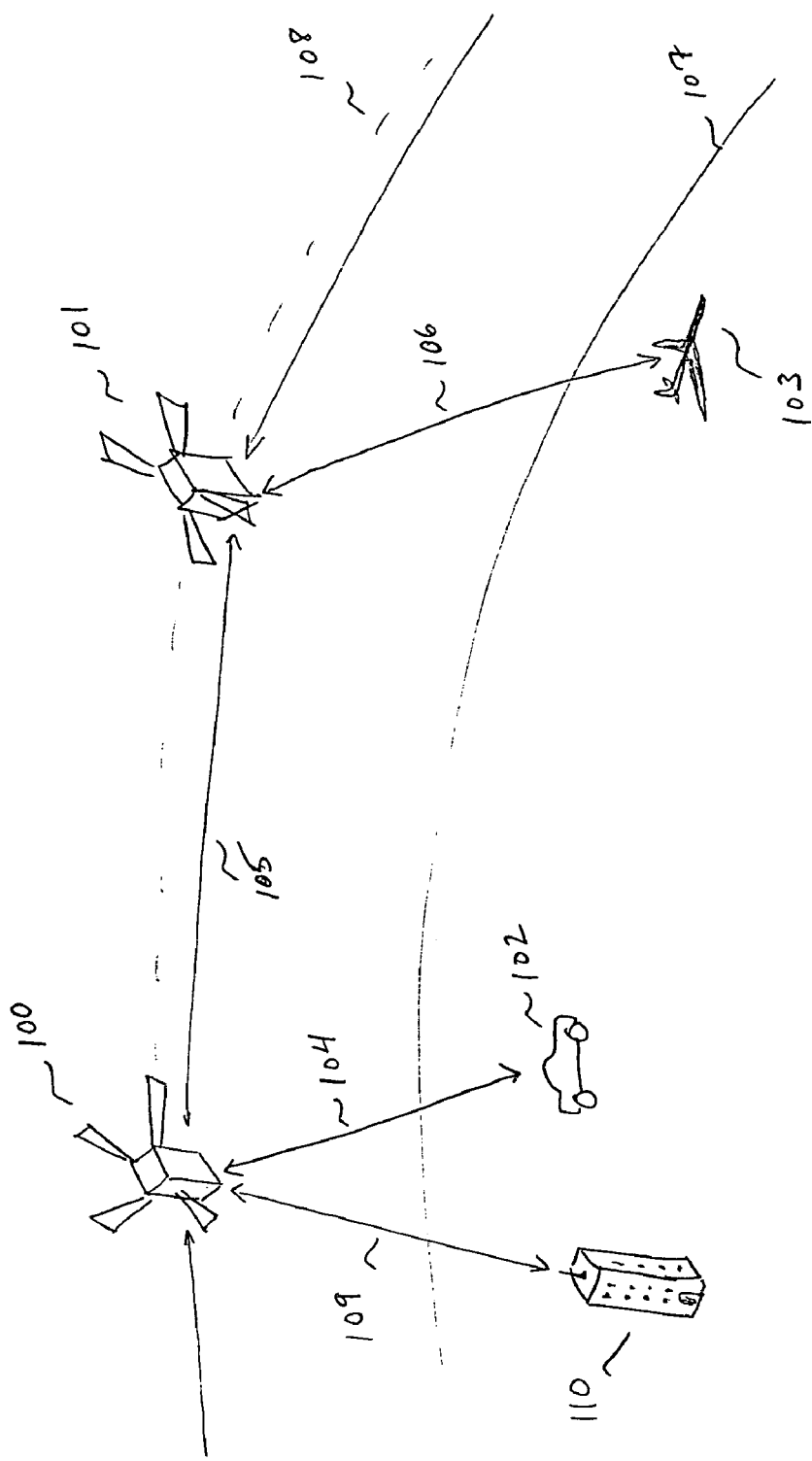
FIG. 1 is a diagram illustrating a conventional OPTSAT Network to which the present invention is applied.

FIG. 1 is a diagram depicting an OPTSAT Network to which the present invention is applied. An OPTSAT is capable of relaying communication signals from one point to another. The OPTSATs as disclosed in U.S. application Ser. No. 10/317,456 are capable of transmitting at rates of up to 2 tera bits per second per user terminal in clear weather, an increase over the prior art by a factor of about 200. Illustrated in FIG. 1 are a partial view of the earth 107, a first optical satellite (OPTSAT) 100, and a second OPTSAT 101. While OPTSATs 100 and 101 are shown at a geosynchronous orbit 108, it should be noted that the OPTSATs can also operate in a different orbit such as a medium earth orbit (MEO). Optical cross-link 105 is also shown. Optical cross-link 105 provides communications between OPTSAT 100 and OPTSAT 101, and can be expanded to provide cross-link communications between multiple OPTSATs (not shown). This cross-link communication is utilized to expand coverage available to a single OPTSAT. In addition, cross-link 105 provides for system synchronization and call handoff to occur between the various OPTSATs of the overall system, as an object being tracked travels from the coverage area of one OPTSAT to the coverage area of another OPTSAT, or when the orbiting OPTSAT moves out of the area of the object. Each OPTSAT contains a multiple beam optical array (not shown) that enables the system to not only provide communication links to a great number of users, but also greatly reduces the size, weight and cost of each OPTSAT. The multiple beam optical array, which will be described in detail below, operates on an optical array of receive and transmit lasers, using micro-electronic mechanical mirror (MEMS) devices or optical switch arrays. Also, each OPTSAT has a coverage area dependent upon the optical array and altitude of the OPTSAT. For example, a LEO (Low Earth Orbit) OPTSAT at 1000 km altitude could cover approximately a 2000 km by 2000 km coverage area per optical array.

Although there are two OPTSATs depicted in FIG. 1, a minimum of only one OPTSAT is required for the system to begin to operate and provide communication links to multiple users. Also, the system is expandable to provide for further coverage with additional OPTSATs added to the system, each OPTSAT being interconnected via an optical cross-link. A fully expanded system can theoretically provide services to hundreds of millions of users.

Returning again to FIG. 1, shown are user locations, namely, vehicle 102, airplane 103, and building 110. Each of the user locations can have one or more users at each location. For example, each passenger on airplane 103 could have an active communication link at any one time. Further, in an expansive version of the proposed communication system, millions of users can be serviced by the expanded system. Also each user can be communicating via data, voice or both. Optical communication links 104 and 109 are for providing data communications between vehicle 102 and building 110, respectively, and OPTSAT 100. Optical communication link 106 is for providing a data link between airplane 103 and OPTSAT 101. Although not shown in FIG. 1, each of the user locations requires an OPTSAT terminal that is exposed to the optical communications links, a requirement of the line-of-sight nature of free space optical links. This line-of-sight or beam-to-beam requirement can be maintained through the use of tracking filters. A tracking filter, for example a Kalman filter, can be used to maintain tracking through positional changes.

To summarize, the OPTSAT Network provides the following features: uplinking and downlinking up to one or more Tbps to multiple users on the earth's surface in clear weather via 1550 nm wavelength fiber optic band; directly, without an intermediate airborne node, uplinking and downlinking up to 1 or more Gbps per surface user in adverse weather (either 1550 nm optical band with 'pulse stretch' modulation or 95-105 GHz millimeter band); each OPTSAT can accommodate many users, e.g., 1000 full time or many times that via multiplexing; and the OPTSATs are cross-linked and accessed by surface users on demand with several net control options.

The present invention utilizes the OPTSAT Network (a constellation of MEO and/or GEO satellites) as wide area surveillance network with, for example, continual revisit periods of seconds, resolution/accuracy to 1 sq. meter, and multiple wavelengths (e.g., IR, optical, and ultraviolet) for detection and identification. The system detects moving or non-moving objects based on requested distinguishing features (e.g., shape, motion, etc.) using the fusion of multiple wavelengths to improve detection probability and reduce false alarm rates. Notionally, the system runs at a 1 sq. meter resolution continually, and is capable of determining altitude and providing further resolution or elevation measurement based on multiple sensors or different sensor looks as the satellite passes overhead and/or in collaboration between adjacent satellites. The system can, in principle, track moving, stationary, surface or air/space-borne vehicles.

Referring again to FIG. 1, continual surveillance of an entire region is made available in detail to each subscriber on the network (i.e., vehicle 102, airplane 103, and building 110) via the OPTSAT linking from OPTSAT 101 and 102. The composite imagery can be displayed for unit operators. The system can automatically alert the users of a detection that meets certain profiles, e.g., based on image assessment or point of origin. The user can view the image manually via any combination of image wavelengths for personal verification of the automatic identification decisions.

FIG. 2 is a diagram illustrating integrated features of a surveillance system utilizing the OPTSAT Network according to an embodiment of the present invention. Each satellite (OPTSATs 200 and 201) in the constellation carries several surveillance apertures 203, for example, one for each wavelength regime. These surveillance apertures 203, the operation of which will be described in more detail with reference to FIGS. 3 and 4, can be mechanically or optically steered using array technology as taught in the OPTSAT disclosure of U.S. application Ser. No. 10/317,456. The image data is continually processed, preferably at distributed processing sites, for detection, identification, and tracking, as tasked by the various users. The surveillance apertures 203 can be independently tasked to revisit each resolution cell up to every few seconds. In addition, it is preferable that tracked airborne objects (e.g., aircraft 205) are tracked by at least two satellites and all wavelengths at a once every few seconds rate, enabling a handoff as one of OPTSATs 200 and 201 passes from view, and for better height measurement accuracy. Each OPTSAT has multiple Tbps OPTSAT links for relay and coordination between other OPTSATs and for communication with airborne or surface units (i.e., vehicle 102, airplane 103, and building 110 as illustrated in FIG. 1).

The image data obtained by the surveillance apertures 203 is linked to terrestrial processing or is processed, e.g., in a distributed manner, on each satellite and surface/airborne networked unit. In the latter (desired) distributed case, terrestrial sensor data could also be fused with the satellite data for coverage under adverse weather where optical wavelengths may not penetrate. Note however that microwave imaging radars such as synthetic aperture radars could be part of the imaging sensor suite on the satellites to penetrate weather themselves.

Preliminary calculations have been performed indicating that for a medium earth orbit and worst-case 2000 km swath, assuming 1×1 meter resolution cells, about $10^{10}$ square meters per second must be surveyed. At 16 bits per cell and 3 wavelengths, the data generation rate is about 0.6 Tbps., within the theoretical per-beam channel capacity of the OPTSAT concept.

As discussed earlier, a main component of the OSISAT surveillance system according to the present invention are surveillance apertures 203, which comprise a multiple beam optical scanning array ("optical array"). Each OSISAT is configured with at least one optical array. The surveillance apertures, which include imaging sensors, in the IR, optical, and/or ultraviolet bands can be configured in one of two configurations conducive to data stream partitioning for the purpose of down-linking to one of more earthbound sites of a rate compatible with electronic data processing on earth. The two present alternatives are an MEMS (Micro-electronic Mechanical Mirrors) device or an optical switches device, each of which will be described in detail herein below.

Figure 3A:
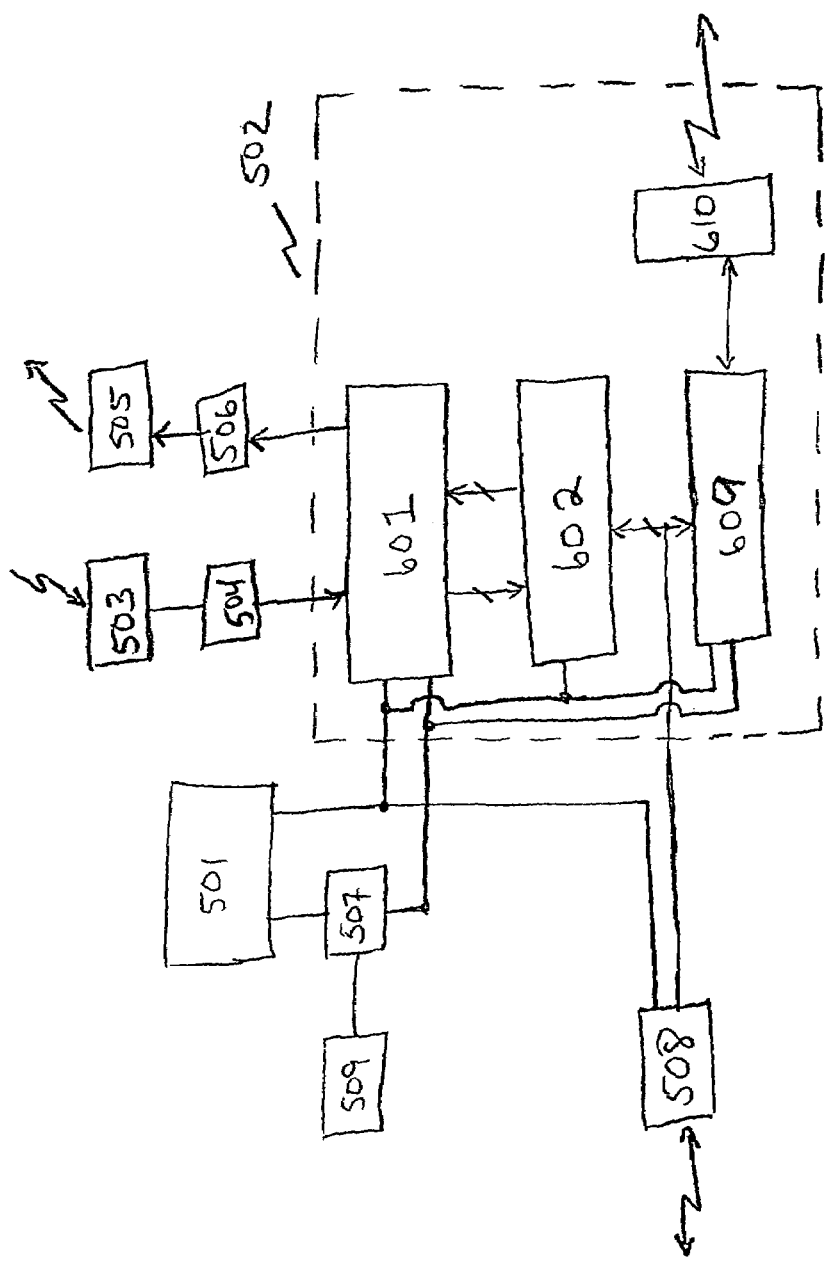
FIG. 3A is a diagram of a multiple beam optical scanning array utilizing a MEMS device according to an embodiment of the present invention.

FIG. 3A is a diagram of the multiple beam optical scanning array utilizing the MEMS device. An optical array 502, which is applied to optical imaging, containing the MEMS multiple beam optical scanning array (MEMS array) will now be described. An optical switch array 601 for routing the optical signals to a number of communications channels to processing sites (503, 504, 505 and 506), a laser amplifier bank 602, or cross-link 508 is shown. Optical switch array 601 is under the control of processor 501 and receives beam steering commands from beam steering controller 507. For active imaging sensors such as imaging laser radars (LADARS) the laser amplifier bank 602 receives signals from the optical switch array 601, amplifies the signals, and transmits the amplified signals to the MEMS bank 609 Surveillance aperture 610 images a target area or an object (emissions or LADAR echoes) and sends the image signals to the MEMS bank 609.

Figure 3B:
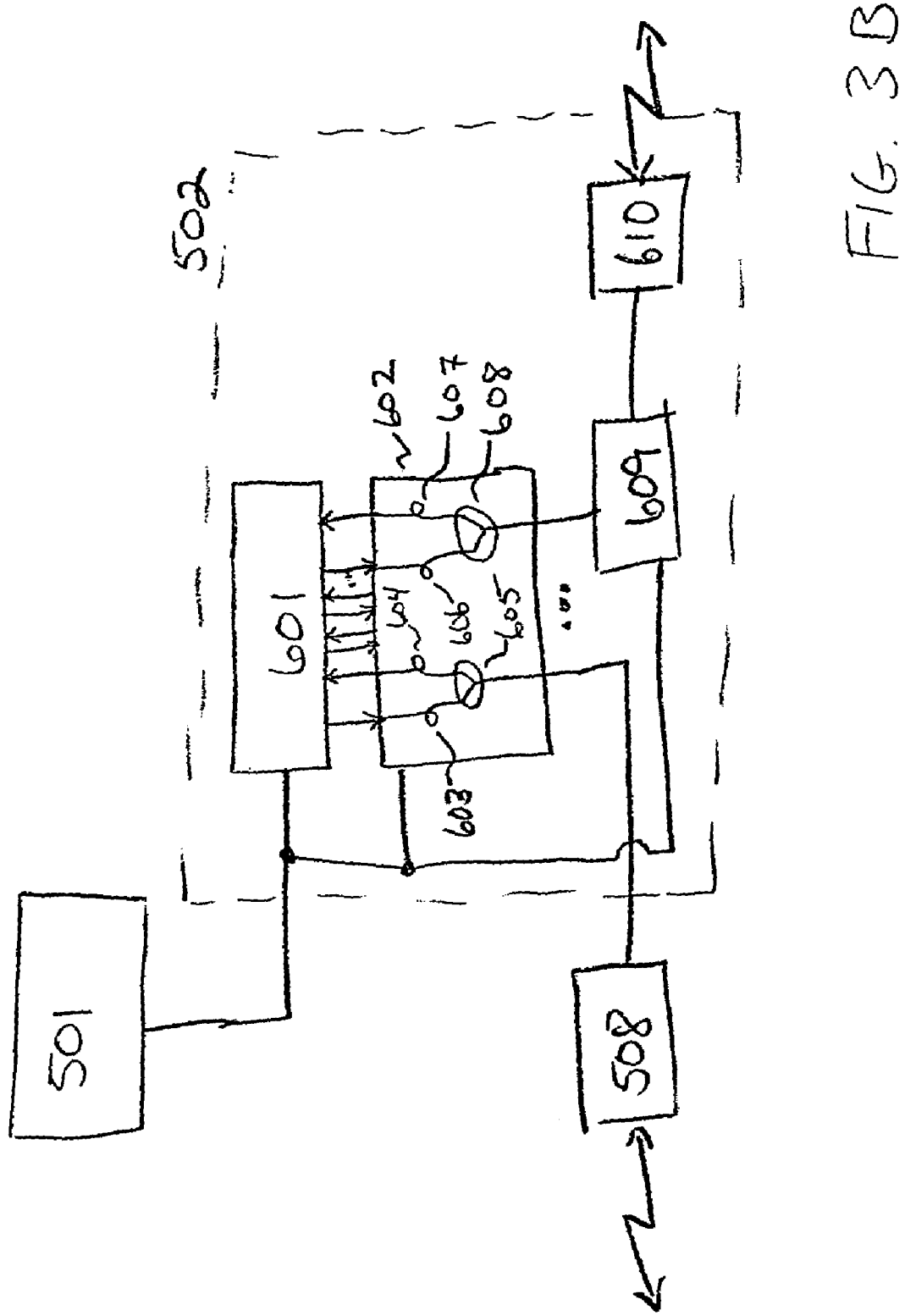
FIG. 3B is a diagram detailing the laser amplifier bank of FIG. 3A.

FIG. 3B is a diagram detailing the surveillance laser amplifier bank of FIG. 3A. Shown in FIG. 3B are optical switch array 601 with multiple pairs of optical receive and transmit (e.g., LADAR) lines connected to laser amplifier bank 602. If passive receive-only optical imaging is designed the transmit lasers would be excluded from the design. A first pair of optical transmit and receive lines are shown connected to a first transmission amplifier 603 and a first high gain reception amplifier 604, each for amplifying their respective signals. A second pair of optical transmit and receive lines are shown connected to a first transmission amplifier 606 and a first high gain reception amplifier 607, each for amplifying their respective signals. Amplifiers 603, 604, 606, and 607 are selected to be appropriate for the sensor wavelengths of interest, but the system is not restricted by the type of amplifiers used. A first bi-directional coupler 605 is shown coupling the first amplified transmit (if LADAR) and receive lines. The coupled signal are output from the laser amplifier bank 602 to cross-link 508 for transmission to another OPTSAT or to users. A second bi-directional coupler 608 is shown coupling the second amplified transmit and receive lines. The coupled signals are output from the laser amplifier bank 602 to MEMS bank 609 for transmission to a user through optical aperture 610, which is preferably a holographic aperture.

As illustrated in FIG. 3A and FIG. 3B, each coupled optical signal emanating from laser amplifier bank 602 has a separate mirror (not shown), located in the MEMS bank 609, associated therewith. The beam steering controller 507 through the use of micro-mechanical devices separately controls each mirror. The speed at which the optical beams can be pointed, scanned and switched is of paramount importance. The use of micro-mechanical devices, though fast, has inherent drawbacks in the time it takes to translate movement from an electrical command to the end of the mechanical adjustment. As a result, an alternative to implement the optical array, namely, an optical switch device, will now be described with reference to FIGS. 4A-C.

Figure 4A:
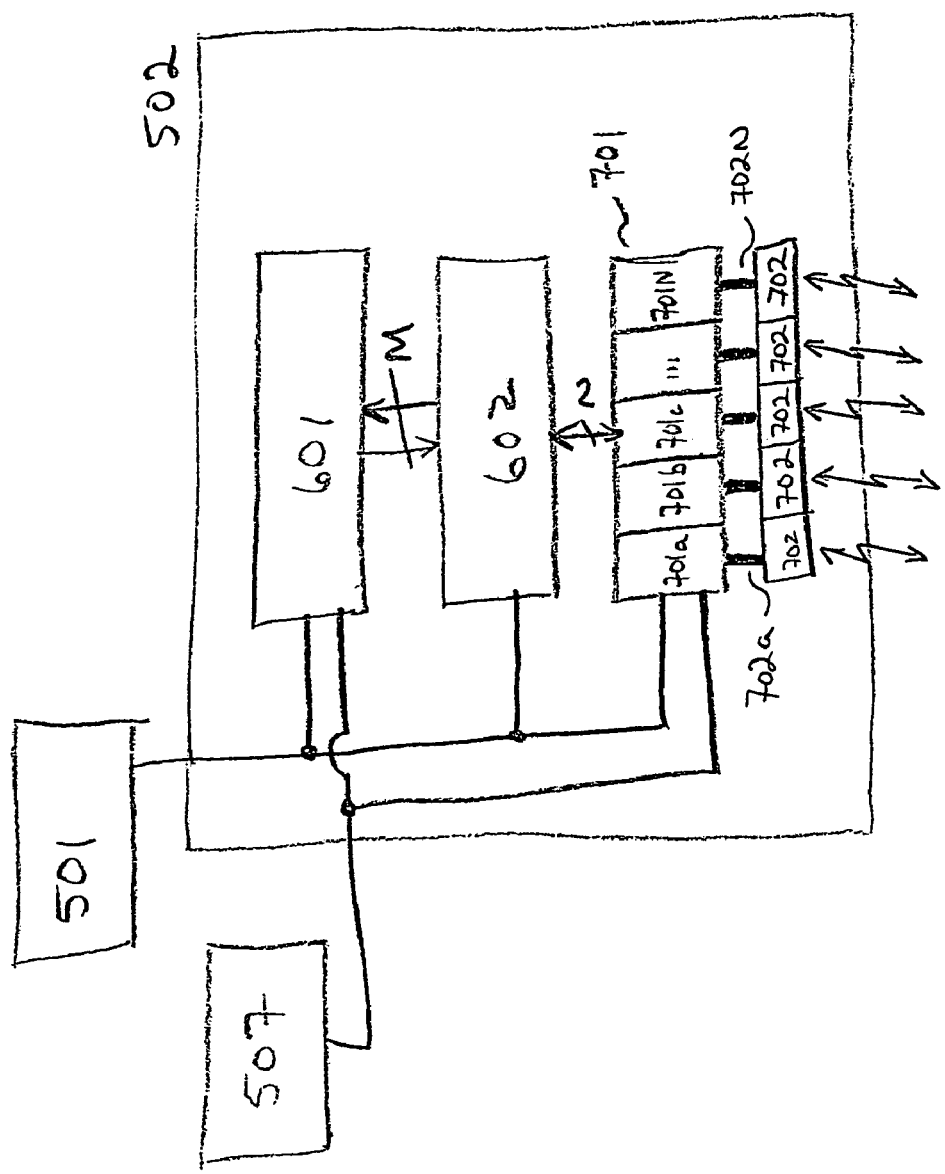
FIG. 4A is a diagram of the multiple beam optical scanning array utilizing an optical switch device according to an embodiment of the present invention.

The second configuration shown in FIGS. 4A-C is also an application of the image sensor scanning multi-beam arrays for use in imaging. As indicated above, it features using layers of optical switches. In this case, similar wavelengths (e.g., within about 10-20%) can be accommodated by a single array of switches. Further, sensor wavelengths shorter than 1550 nm (as for visible and ultraviolet bands) can be potentially accommodated with commercial 1550 nm fiber optic switches and fiber. For IR bands, analogous switches and fiber optimized for these wavelengths are likely to be necessary to avoid fiber cutoff wavelength conditions. For example, sapphire or chalcogenide fiber technology is required for IR propagation in fiber. As for the MEMS configuration, several such switch array assemblies might be needed to span the desired wavelengths for each imaging satellite.

FIG. 4A is a diagram of the optical array utilizing the optical switch device. As FIG. 4A illustrates, the optical array subsystem 502 differs from the MEMS configuration in that the optical switch approach replaces the MEMS bank 609 with one or more layers of 1×N optical switch bank unit 701. As illustrated in FIG. 4A, M pairs of transmit and receive optical lines are fed into optical amplifier 602 where they are coupled in the bi-directional couplers, as shown in FIG. 6B. Optical amplifier 602 outputs N bi-directional optical lines. The N bi-directional optical lines are fed into the optical switch bank unit 701, which is comprised of N optical switch banks 701a-701N, one switch bank for each bi-directional optical line. The optical switch bank unit 701 outputs N fiber bundles 702a-702N. Each fiber bundle 702a-702N is directly connected to a surveillance aperture 702. The number of surveillance apertures 702 is equal to N. The surveillance apertures 702 perform imaging in their respective wavelengths and transmit the image signals through the fiber bundles 702a-702N.

FIG. 4B is a detailed view of the optical switch bank unit 701 depicted in FIG. 4A. As illustrated in FIG. 4B, each optical switch bank 701a-701N is a series of binary switches. The binary switches are under the control of the beam steering controller 507. As the object being tracked and imaged moves and changes position, the OSISATs can be tasked to continually monitor the position of the object (e.g., via an internal or user tracking filter update). As the object moves, the beam steering controller 507, switches from one pair of switches to another to continually image the tracked object.

FIG. 4C is a detailed illustration of a second embodiment of the optical apertures shown in FIG. 4A and FIG. 4B. As shown in FIG. 4C, the N surveillance apertures 702 are replaced by a single shared surveillance aperture 703. All of the inputs of the optical switch banks 701a-701N are fed from the single shared surveillance aperture 703. The single surveillance aperture 703 is a common holographic lens used for all beam positions allowing potentially greater optical image resolution due to the larger aperture.

The image streaming approach described in the present application is also applicable for microwave or millimeter wave imaging sensors such as radiometers and synthetic aperture radars. These also generate high volumes of image signal data and have the advantage of cloud penetration for all-weather surveillance. As these systems are readily designed with phased array technology to partition the imagery, the image partitioning configurations described above are not necessary or applicable.

The configuration that uses the MEMS mirror array (FIG. 3A) will be considered to address the problem of partitioning the extremely high bandwidth imagery so that downlinking and distributed electronic processing of the imagery is possible. This approach may be more flexible in straightforward tasking of individual MEMS elements for special searches, cued spotlight, or extreme resolution for object identification. First, because multiple, parallel MEMS assemblies are employed, each such assembly covers a portion of the total observation area, so that for 250 assemblies totaling the example 0.6 Tbps of total imagery information generation (assuming the sensing signals inherently contain information bit rate comparable to the digitized signal bit rate), each assembly can generate 2.5 Gbps of bandwidth, a data rate that can be readily digitally processed with present electronics. As electronics processing speed and capacity performance increases with new products, streaming of correspondingly larger rates, e.g., 10 Gbps, can be specified via changing the switching configuration or allocating larger imaging areas to individual MEMS elements.

Figure 5:
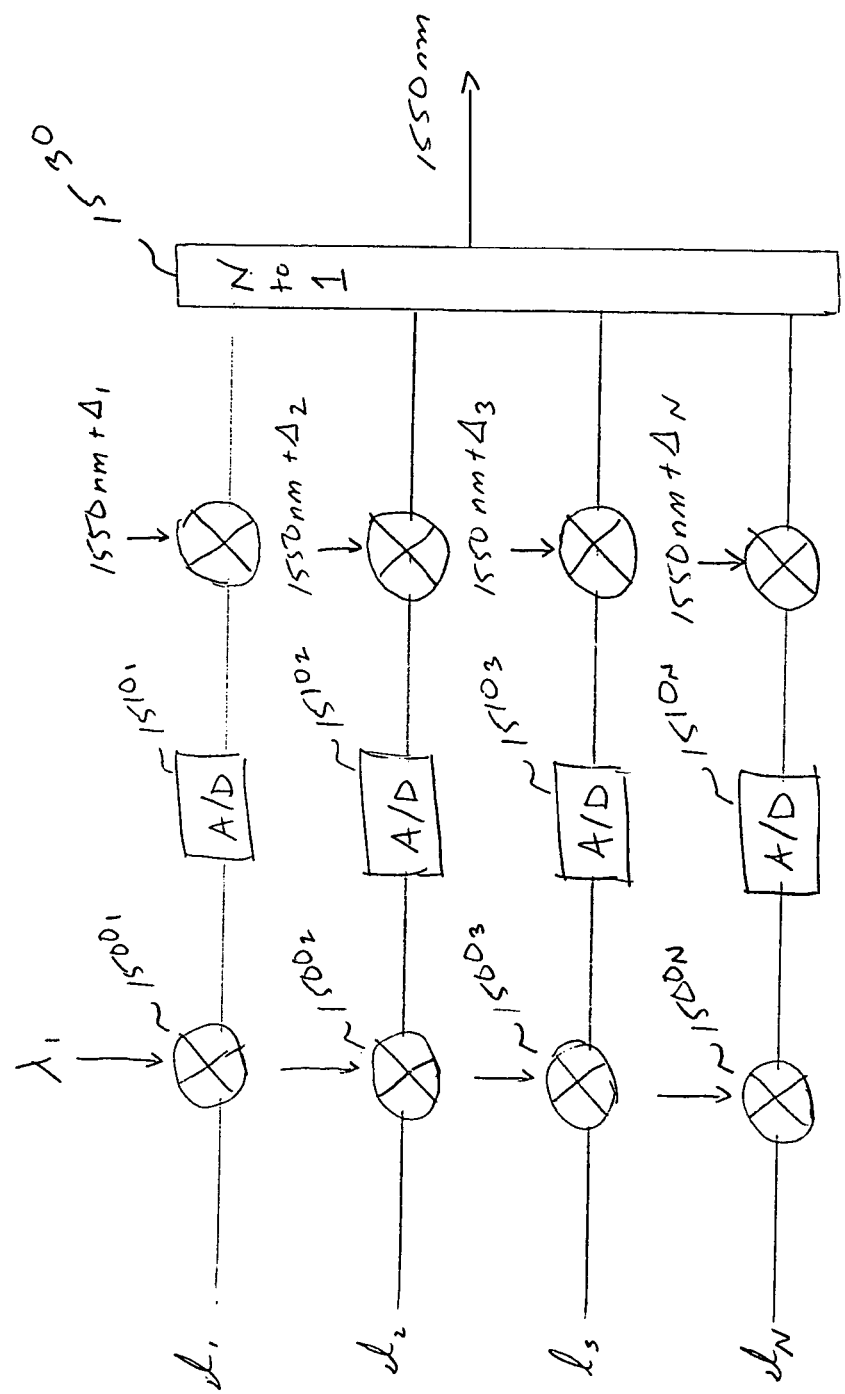
FIG. 5 is a diagram illustrating an apparatus for converting from multiple imaging sensor wavelengths to a baseband signal according to an embodiment of the present invention.

FIG. 5 illustrates an apparatus for converting from multiple imaging sensor wavelengths to base band signal where each resulting 2.5 GHz signal can be digitized (digitally sampled) and image compressed (to reduce bandwidth) within the processing speed capabilities of present electronics. The base band digital data stream is then converted to fiber carrier wavelength (1550 nm) for OPTSAT downlink transmission to a designated processing site. This approach is an extension of the millimeter array antenna concept described in the OPTSAT disclosure in U.S. application Ser. No. 10/317,456.

Referring to FIG. 5, image signals $I_1$-$I_n$, which are produced in an image aperture, are transmitted to mixers $1500_1$-$1500_N$ where they are combined with signal $\lambda_1$, which eliminates harmonic distortion in the signals. Next, the signals are passed through A/D (analog-to-digital) converters $1510_1$-$1510_N$, where the signals are transformed from analog signals to digital signals. The digital signals are modulated by mixer/modulators $1520^1$-$1520_N$, where the signals are modulated to a fiber optic carrier signals and multiplexed by offsets $\Delta_1$-$\Delta_N$, respectively. The modulated signals are then combined in a combiner 1530 and transmitted as a single signal to a destination (e.g., another OPTSAT, a fixed ground terminal, etc.).

Figure 6:
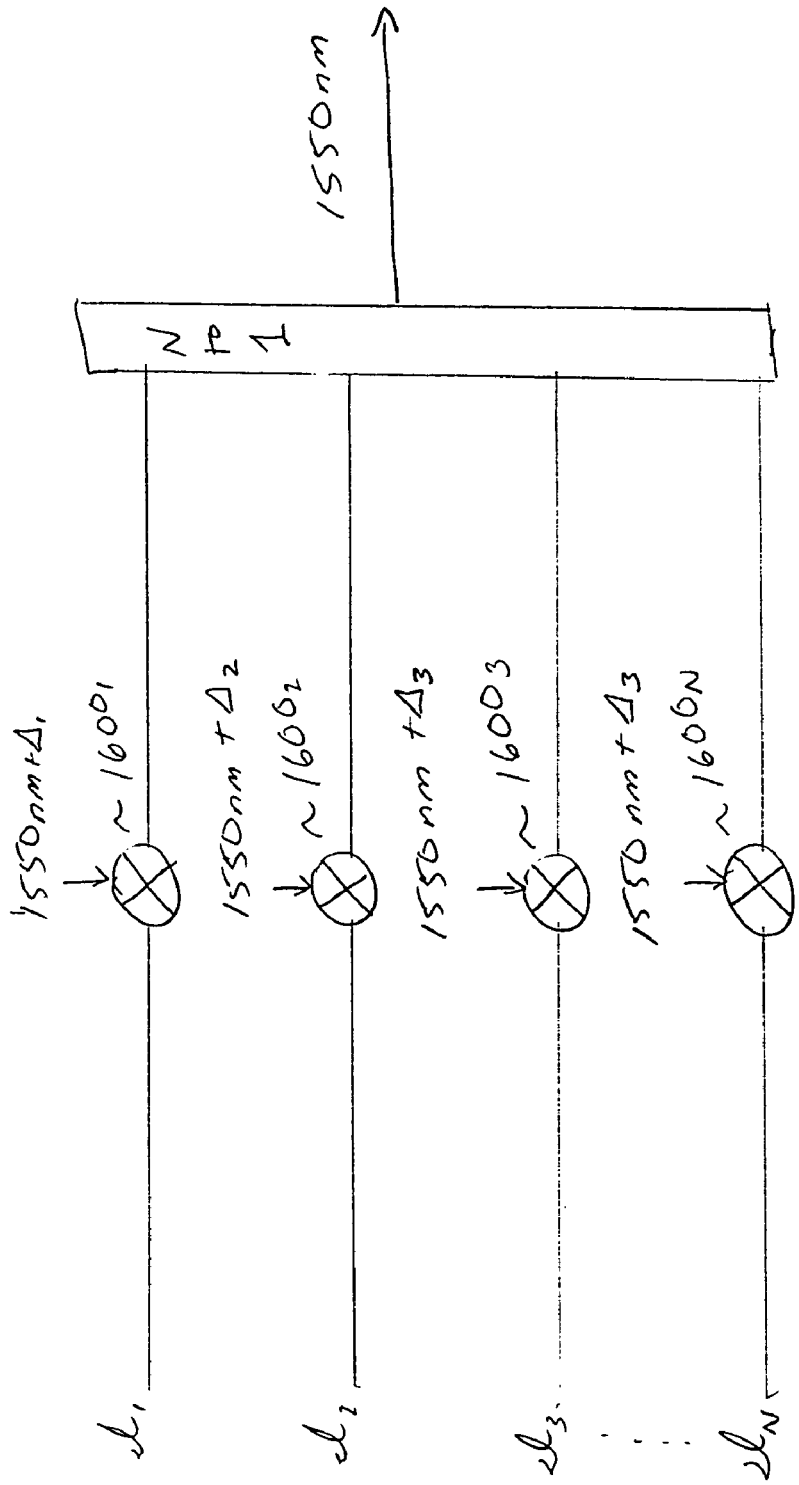
FIG. 6 is a diagram illustrating an apparatus for converting from multiple imaging sensor wavelengths directly to a fiber transmission according to an embodiment of the present invention.

FIG. 6 illustrates a more straight-forward approach that converts the imagery signals $I_1$-$I_n$ (IR, visible, UV, microwave, millimeter wave) directly to 1550 nm optical form for OPTSAT transmission by converting from the image wavelength directly to the fiber wavelength for 'analog' downlinking signal to a designated processing site using mixer/modulators $1600_1$-$1600_N$. The processing sites are where conversion to base band for electronic signal and image processing can then occur. Advantages of this more direct conversion are a) elimination of a function on the imaging platform and b) allocating electronic processing to the earth sites where technological improvements in processing speed can be implemented as they are available (thus preventing obsolescence of the imaging platform processing).

Note that the pulse-stretch optical waveform identified in U.S. application Ser. No. 10/317,456 suggests that the signal be further subdivided into 1.5 Mbps channels for transmission through clouds, with bundles of channels totaling the 2.5 Gbps MEMS stream directed to a designated site.

Alternatively, one could convert the image signals to the OPTSAT millimeter (mm) carrier band (nominally 95 GHz) for down-linking to some sites (fewer sites due to mm band limitations), for example, in extreme adverse weather exceeding the capabilities of optical pulse stretching (as described for OPTSAT).

The companion patent application, U.S. application Ser. No. 10/317,456, provides a description of OPTSAT network to control the ability for each user to access the network for calling one or more other parties with guaranteed service, e.g., bandwidth. This same mechanism can be extended for an authorized earthbound user to task the OSISAT network for special imaging modes, e.g., for more frequent revisit updates of a region, longer time 'staring' at a location, cooperative stereo imaging by adjacent satellites, special extreme resolution modes, e.g., LADAR with range resolution in centimeters, or more wavelengths of imaging to support object identification.

Figure 7:
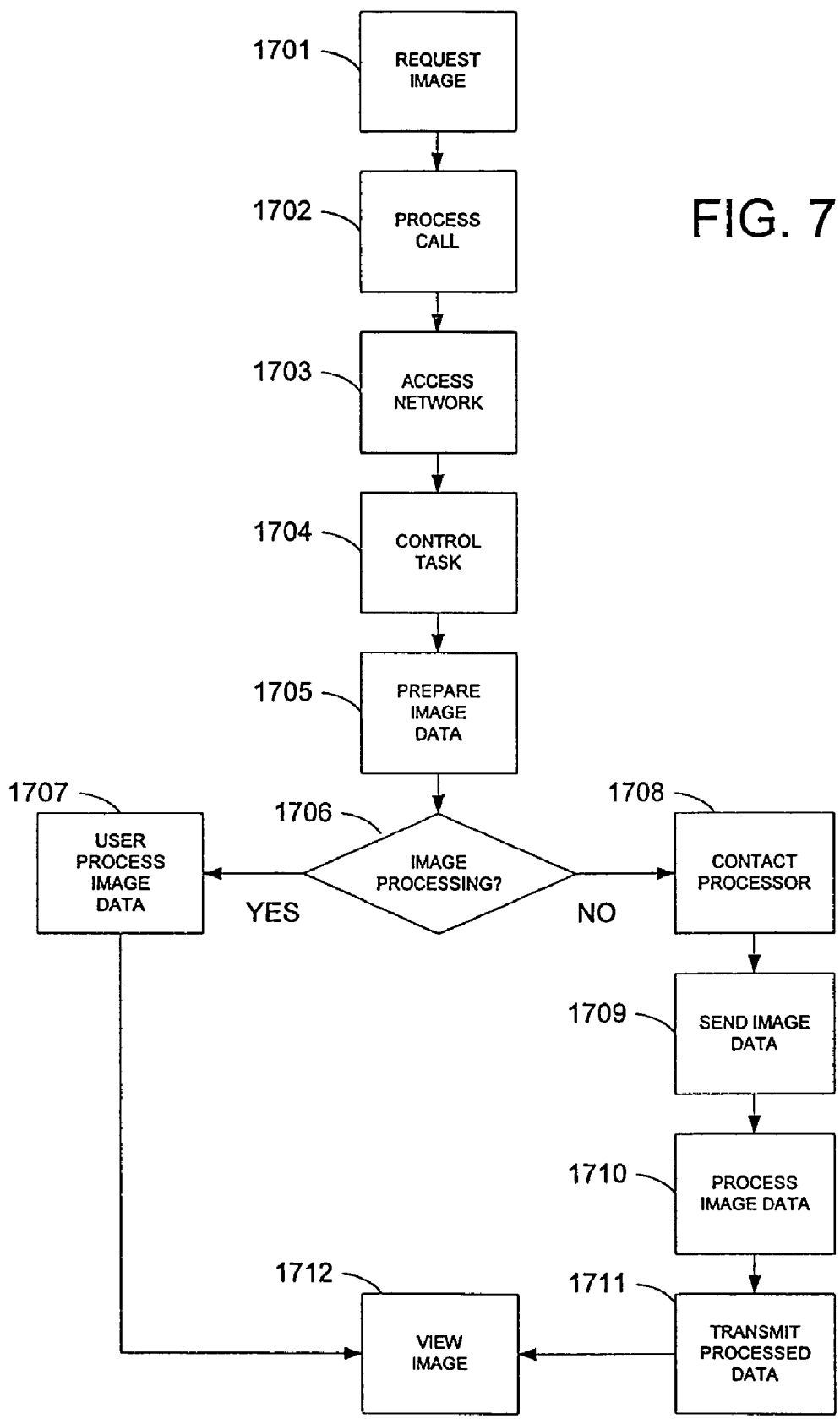
FIG. 7 is a flow chart illustrating imager tasking via the OPTSAT architecture.

It is assumed that the OSISAT system rides on an OPTSAT network so that the calling and networking features of OPTSAT access are provided to the surveillance imaging function. FIG. 7 illustrates a logic flow for accessing the network for special processing. Note that such accessing could be provided from a central location, a processing center, or an individual in a deployed area with an optical/millimeter OPTSAT terminal.

Referring to FIG. 7, in step 1701 an image user, e.g., a user at a fixed ground terminal, requests an OSISAT image. In step 1702, OPTSAT call processing is performed as described in U.S. application Ser. No. 10/317,456, enabling the image user to be connected to a particular OSISAT with the imaging capabilities. The image user is then given access to the OSISAT output in step 1703 and commands the OSISAT to perform an imaging task in step 1704. In step 1705 the OSISAT prepares to respond (via its onboard OPTSAT) with the image data. However, in step 1706, it is first determined if the image user has image data processing capabilities via the onboard record of the user's properties. If the image user has the requisite processing capabilities, then the image data is sent to the image user and processed therein in step 1707. The image user then views the processed image data, the actual image(s), in step 1712.

However, if the image user does not possess the requisite image data processing capabilities in step 1706, the OPTSAT sets up a communication with an image center in the OPTSAT Network that does contain the processing capabilities in step 1708. The OPTSAT then sends the image data to the image center for processing in step 1709. The image center processes the image data in step 1710 and then sends the processed image data utilizing the OPTSAT Network to the image user in step 1711, and the image user then views the processed image data, the actual image(s), in step 1712.

FIG. 8 illustrates a distributed processing concept. Data stream partitioning, converting to OPTSAT fiber wavelength and downlink reception (even in significant adverse weather) allows about 2.5 Gbps of image information to process. For this concept description we assume the extreme 0.6 Tbps rate per ISOSAT. Note that such rate does not mean that each satellite must have 250 distribution sites, each to process 2.5 Gbps. One site may possess a total processing capability of, for example, 0.2 Tbps so that many 2.5 Gbps channels could be sent to a single node. As another example, the entire data rate could be down linked in one OPTSAT beam to one processing coordination center for routing via in-ground fiber to a confederation of centers (in the clear, with backup sites against inclement weather at the primary site).

In FIG. 8, an image user 1807 requests image data from a specific area 1801, which can imaged by the OSISATs connected via the OPTSAT Network (OPTSATS $1800_1$-$1800_N$). The image data is obtained by OPTSAT $1800_1$ and is then transmitted through the OPTSAT Network to at least one of image processing sites $1805_1$-$1805_N$. The image data is processed in the image processing sites $1805_1$-$1805_N$, and then transmitted over the OPTSAT Network to the image user 1807, enabling the user to view an image of area 1801.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A system for providing real-time image control and processing for use in wide area space based surveillance utilizing an Optical Tera-bps Satellite (OPTSAT) network, including a plurality of OPTSATs, the system comprising:
    at least one surveillance aperture, on-board one of the plurality of OPTSATs, for optically imaging an object, wherein the surveillance aperture on-board the OPTSAT receives an optical signal representative of an optical image of the object;
    at least one image processor for processing the optical image obtained by the at least one surveillance aperture; and
    at least one terminal capable of wirelessly transceiving information between the at least one terminal and the at least one of the plurality of OPTSATs, the at least one terminal includes a display for displaying the optical image,
    wherein the at least one surveillance aperture is connected to a multiple beam optical array transceiver comprising:
        at least one receive amplifier for amplifying received optical signals;
        at least one micro-electronic mechanical (MEM) mirror for reflecting free-space optical signals;
        at least one bi-directional optical coupler connected to the receive amplifier, and associated with the MEM mirror, for receiving from the connected amplifier an optical signal, and reflecting a free-space optical signal onto and receiving a reflected free-space optical signal from the associated MEM mirror; and
        a controller for controlling the aiming of the MEM mirror.

2. The system of claim 1, wherein the at least one image processor is included in at least one of the plurality of OPTSATs.

3. The system of claim 1, wherein the at least one image processor is located in a ground based image processing center.

4. The system of claim 1, wherein the at least one image processor is included in the at least one terminal.

5. The system of claim 1, wherein:
    the image processor is a terrestrial or airborne image processor;
    the at least one OPTSAT includes a converter configured to convert the received optical signal representing the optical image to an optical wavelength suitable for optical fiber transmission; and
    the OPTSAT down-links the optical wavelength to the terrestrial or airborne image processor.

6. A system for providing real-time image control and processing for use in wide area space based surveillance utilizing an Optical Tera-bps Satellite (OPTSAT) network, including a plurality of OPTSATs, the system comprising:
  at least one surveillance aperture, on-board one of the plurality of OPTSATs, for optically imaging an object, wherein the surveillance aperture on-board the OPTSAT receives an optical signal representative of an optical image of the object, wherein the at least one surveillance aperture includes a multiple beam optical array transceiver, comprising:
    at least one receive amplifier for amplifying received optical signals;
    at least one micro-electronic mechanical (MEM) mirror for reflecting free-space optical signals;
    at least one bi-directional optical coupler connected to the receive amplifier, and associated with the MEM mirror, for receiving from the connected amplifier an optical signal, and reflecting a free-space optical signal onto and receiving a reflected free-space optical signal from the associated MEM mirror; and
    a controller for controlling the aiming of the MEM mirror;
  at least one image processor for processing the optical image obtained by the at least one surveillance aperture; and
  at least one terminal capable of wirelessly transceiving information between the at least one terminal and the at least one of the plurality of OPTSATs, the at least one terminal including a display for displaying the optical image; and
  wherein the system further comprises at least one transmit amplifier for amplifying optical signals prior to transmission when utilizing a LADAR on-board the OPTSAT.

7. A system for providing real-time image control and processing for use in wide area space based surveillance utilizing an Optical Tera-bps Satellite (OPTSAT) network, including a plurality of OPTSATs, the system comprising:
  at least one surveillance aperture, on-board one of the plurality of OPTSATs, for optically imaging an object, wherein the surveillance aperture on-board the OPTSAT receives an optical signal representative of an optical image of the object;
  at least one image processor for processing the optical image obtained by the at least one surveillance aperture; and
  at least one terminal capable of wirelessly transceiving information between the at least one terminal and the at least one of the plurality of OPTSATs the at least one terminal includes a display for displaying the optical image,
  wherein the at least one surveillance aperture is connected to a multiple beam optical array transceiver comprising:
    at least one receive amplifier for amplifying received optical signals;
    at least one bi-directional optical switch bank having a bi-directional fiber optic input and a plurality of bi-directional fiber optic outputs;
    at least one bi-directional optical coupler connected to the receive amplifier, and having a bi-directional port for communicating with the input of the switch bank; and
    a controller for controlling the switch bank.

8. The system of claim 7, wherein the at least one image processor is included in at least one of the plurality of OPTSATs.

9. The system of claim 7, wherein the at least one image processor is located in a ground based image processing center.

10. The system of claim 7, wherein the at least one image processor is included in the at least one terminal.

11. The system of claim 7, wherein:
  the image processor is a terrestrial or airborne image processor;
  the at least one OPTSAT includes a converter configured to convert the received optical signal representing the optical image to an optical wavelength suitable for optical fiber transmission; and
  the OPTSAT down-links the optical wavelength to the terrestrial or airborne image processor.

12. A system for providing real-time image control and processing for use in wide area space based surveillance utilizing an Optical Tera-bps Satellite (OPTSAT) network, including a plurality of OPTSATs, the system comprising:
  at least one surveillance aperture, on-board one of the plurality of OPTSATs, for optically imaging an object, wherein the surveillance aperture on-board the OPTSAT receives an optical signal representative of an optical image of the object, wherein the at least one surveillance aperture includes a multiple beam optical array transceiver, comprising:
    at least one receive amplifier for amplifying received optical signals;
    at least one bi-directional optical switch bank having a bi-directional fiber optic input and a plurality of bi-directional fiber optic outputs;
    at least one bi-directional optical coupler connected to the receive amplifier, and having a bi-directional port for communicating with the input of the switch bank; and
    a controller for controlling the switch bank;
  wherein the system further comprises at least one transmit amplifier for amplifying optical signals prior to transmission when utilizing a LADAR on-board the OPTSAT.

13. A system for providing real-time image control and processing for use in wide area space based surveillance utilizing an Optical Tera-bps Satellite (OPTSAT) network, including a plurality of OPTSATs, the system comprising:
  at least one surveillance aperture on-board at least one of the plurality of OPTSATs for imaging an object, the at least one surveillance aperture including a multiple beam optical array transceiver, comprising:
    at least one receive amplifier for amplifying received optical signals;
    at least one bi-directional optical switch bank having a bi-directional fiber optic input and a plurality of bi-directional fiber optic outputs;
    at least one bi-directional optical coupler connected to the receive amplifier, and having a bi-directional port for communicating with the input of the switch bank; and
    a controller for controlling the switch bank,
    wherein the switch bank comprises a plurality of optical switches connected in a binary branch configuration between the input and the plurality of outputs of the switch bank for at least one of
      receiving an optical signal at the input of the switch bank and controlling a transmission direction of the free-space optical signals through the surveillance aperture by directing the optical signal to one of the plurality of outputs according to the switching of the optical switches, and receiving a free-space optical signal at one of the output ports of the switch bank by controlling the receiving direction of the multiple beam optical array transceiver according to the switching of the optical switches.

14. The system of claim 13, wherein the system further comprises at least one transmit amplifier for amplifying optical signals prior to transmission when utilizing a LADAR on-board the OPTSAT.

15. A system for optically imaging one or more terrestrial-based or airborne objects, comprising:
a laser radar (LADAR) equipped optical satellite, comprising:
an optical aperture for transceiving free-space optical signals; and
a multiple beam optical array transceiver, comprising:
an optical beam steering controller configured to issue optical beam steering commands;
an optical amplifier bank including transmit amplifiers and receive amplifiers;
an optical beam steering mechanism optically coupled between the optical amplifier bank and the optical aperture, including beam steering components that are configured, responsive to the beam steering commands, to
(i) receive optical signals from the transmit amplifiers, and direct the optical signals through the optical aperture in desired directions toward the one or more objects in order to image the one or more objects, and
(ii) receive optical signals through the aperture from the desired directions corresponding to the one or more objects, and pass the received optical signals to the receive amplifiers, wherein the received optical signals represent optical images of the one or more objects; and a converter configured to convert the received optical signals representing the optical images to an optical wavelength suitable for optical fiber transmission,
wherein the multiple beam optical array transceiver and optical aperture are configured to down-link the optical wavelength; and
a terrestrial-based or airborne terminal configured to receive the down-linked optical wavelength, recover the optical images of the one or more objects from the optical wavelength, and including a display to display the recovered optical images.

16. The system of claim 15, wherein the beam steering components comprise an optical switch bank including bidirectional optical switches that branch from a base node of the switch bank that is optically coupled to the amplifier bank to terminal nodes of the switch bank that are optically coupled to the optical aperture, the optical switches configured to
receive an optical signal at the base node of the switch bank and control a transmission direction of the optical signal through the optical aperture as a free-space optical signal by directing the optical signal to one of the terminal nodes according to the switching of the optical switches responsive to the optical beam steering commands, and
control a direction from which a free-space optical signal is received through the optical aperture by directing the received free-space optical signal from a selected one of the terminal nodes to the base node according to the switching of the optical switches responsive to the optical beam steering commands.

* * * * *